March 4, 1941.　　　　R. J. RAMER　　　　2,233,821
STUMP PULLER
Filed Feb. 14, 1939　　　　3 Sheets-Sheet 2

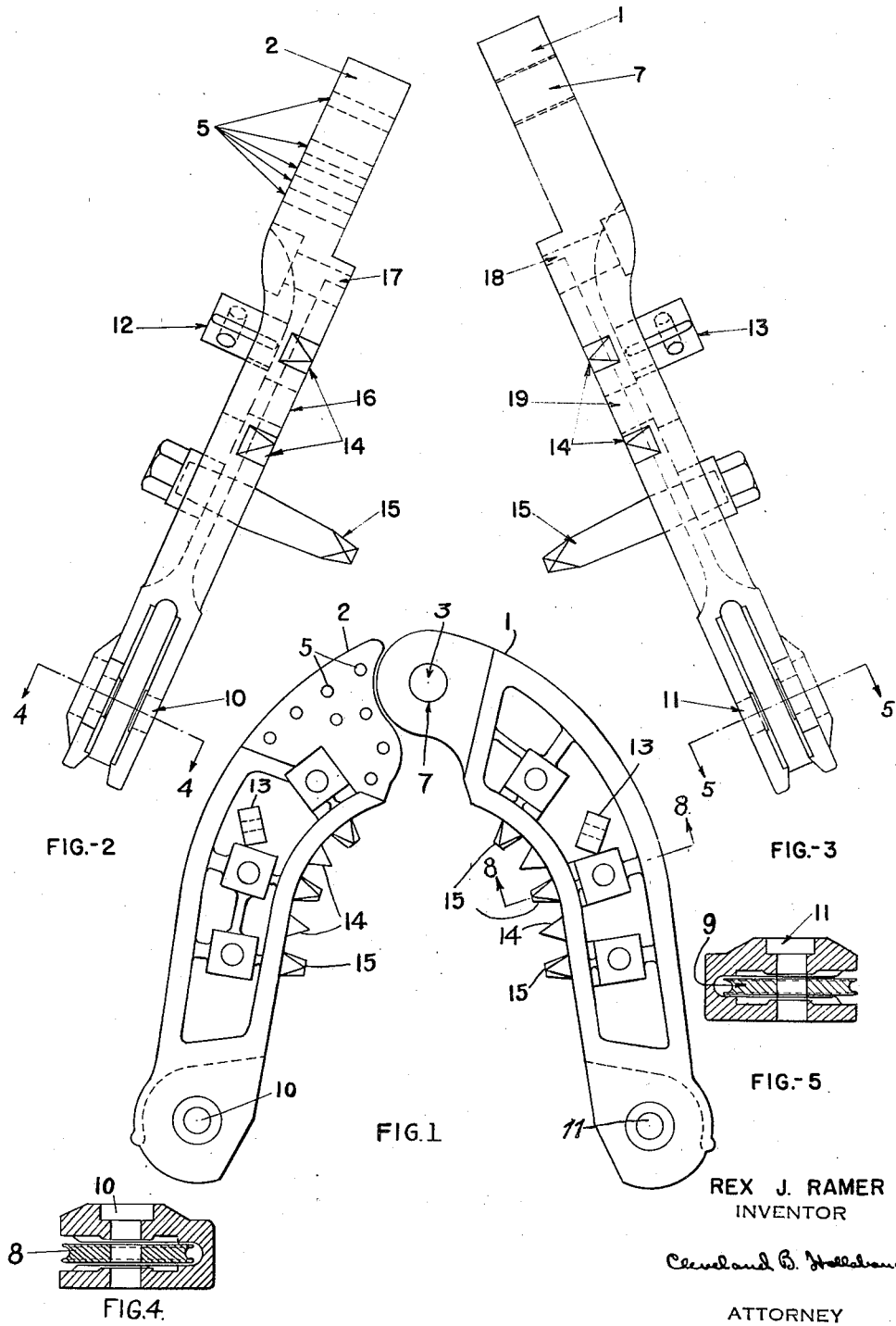

REX J. RAMER
INVENTOR

ATTORNEY

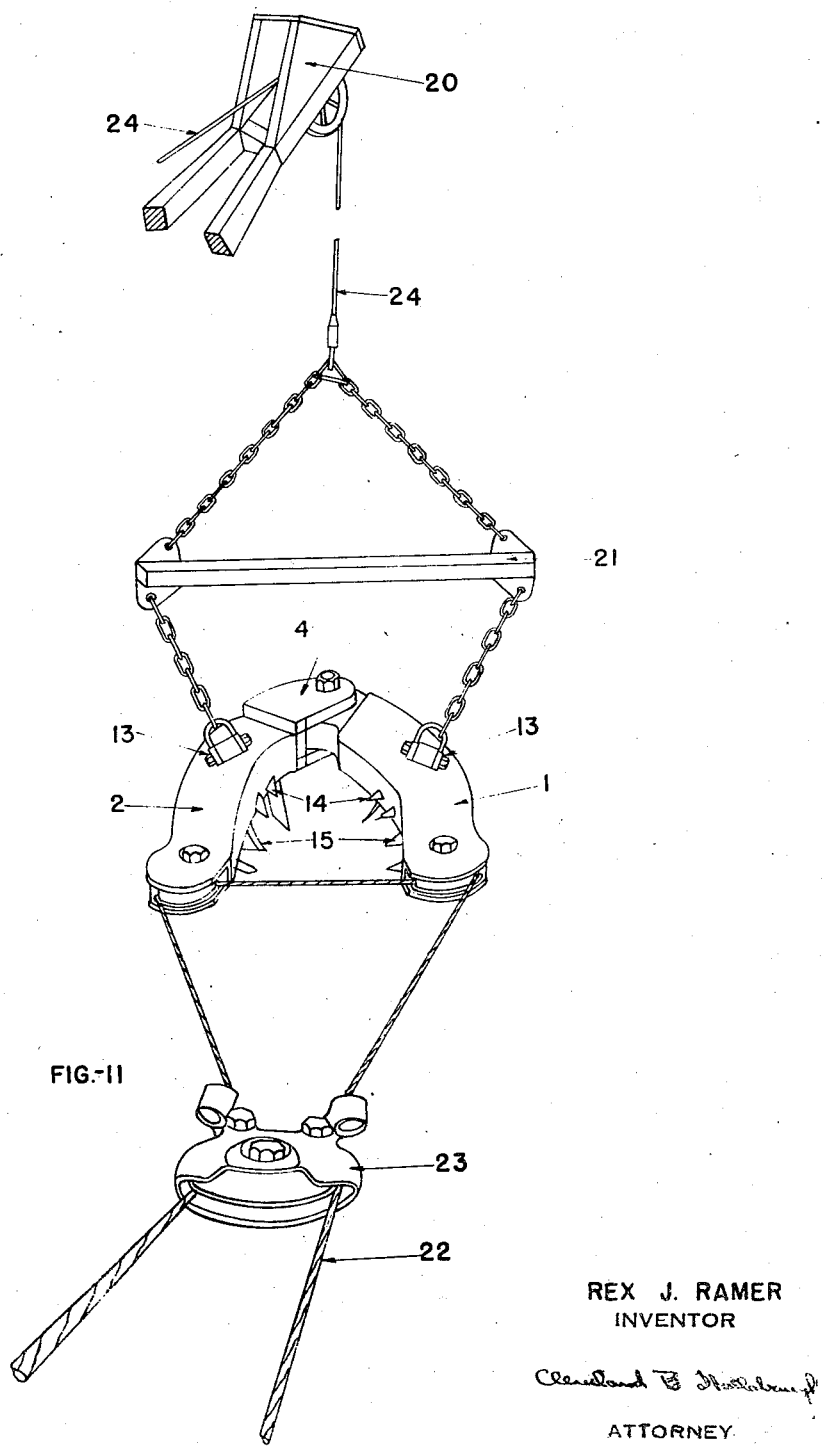

UNITED STATES PATENT OFFICE 2,233,821

STUMP PULLER

Rex J. Ramer, Brunswick, Ga., assignor to Hercules Powder Company, Wilmington, Del., a corporation of Delaware Application February 14, 1939, Serial No. 256,313

5 Claims. (Cl. 37—2)

This invention relates to an improved stump puller and more particularly to a stump puller that includes an improved clamp device for firmly gripping the stump, known to the art as a "nut cracker," and designed especially to aid in removing "low cut" stumps.

It is well known that there are many means of removing stumps from cutover land. Thus, stumps have been dug, blasted, burned, and pulled from the ground depending upon labor conditions and upon the use to which the stumps, themselves, are to be put. Now when stumps are to be used in the naval stores industries, the most economical means of obtaining stumps is by pulling them from the ground. To pull a stump, the art normally exerts a horizontal force on the stump by means of a drag line operating through a block and tackle, tractor, crane, or the like, but when it is necessary to pull "low cut" stumps, difficulties are encountered in providing an efficient way of attaching the drag line to the stump.

The object of this invention is to produce a stump puller that may be used to remove "low cut" stumps. A further object of this invention is to produce a stump puller having an improved "nut cracker" attached to the crane boom and drag line, and that may be used in removing "low cut" stumps. A still further object of this invention is to produce a stump puller having a "nut cracker" attachment that will provide means whereby economical stump removing operations may be carried out in territories containing a large number of "low cut" stumps. Other objects will appear hereinafter.

The term "low cut" is applied to tree stumps which were originally cut close to the surface of the ground or to stumps that have had their tops recut and therefore extend only a few inches, for example, about six inches above the surface of the ground.

The term "nut cracker" is applied to a jaw type device similar in action to a nut cracker, that is used to firmly grip the stumps being pulled from the ground.

Having indicated the broad scope of this invention a preferred embodiment thereof will be described in detail with reference to the attached drawings in which:

Figure 1 represents a plan view of the "nut cracker" in a partially assembled condition.

Figure 2 is a side view of the left hand member of the unit shown in Figure 1.

Figure 3 is a side view of the right hand member of the unit shown in Figure 1.

Figure 4 is a cross section of the left hand member of the unit along the line 4—4 in Figure 2.

Figure 5 is a cross section of the right hand member of the unit along the line 5—5 in Figure 3.

Figure 11 shows the method of attaching the "nut cracker" to the crane boom and drag line, to complete a stump pulling machine.

Figure 10:
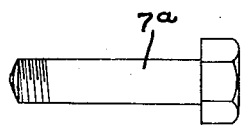
Figure 10 is the hinge pin which, in conjunction with hinge plates of Figure 6, holds the right and left hand members of the stump puller Figure 1 together.

In accordance with this invention the "nut cracker" shown partially assembled in Figure 1 includes a right hand member 1 and a left hand member 2 spaced in proper relation to each other for hinging. The two members are to be hinged together at point 3 by the use of a pair of hinge plates, shown in Figure 4, and a hinge pin, shown in Figure 10. The hinging of the two members 1 and 2 together is accomplished by bolting a hinge plate 4, Figure 6, to each side of the left hand member 2 by the use of a series of bolts, not shown, in bolt holes 5 of left hand member 2 and bolt holes 5 in the hinge plate 4, Figure 6. It will be apparent that after attaching a hinge plate 4 to each side of the left hand member 2 that the pin hole 6 of the hinge plates may be aligned with the pin hole 7 of the right hand member 1 thus allowing the insertion of the hinge pin 7a, Figure 10, to complete the hinging of the two members. The hinge pin, Figure 10, may be keyed in place or may be threaded to allow a retaining nut to be used or may be otherwise suitably fastened in place.

The two members 1 and 2 freely hinged at point 3 are equipped with means for drawing the unhinged ends together. The means may include a cable running around pulleys 8 and 9 located centrally in the unhinged ends of members 1 and 2. Figures 4 and 5 show the location of the pulleys 8 and 9 respectively and further indicate that these pulleys 8 and 9 are to be fastened into place by pins inserted into the holes 10 and 11. A cable acting through pulleys 8 and 9 serves to close the jaws of the "nut cracker." The members 1 and 2 have eyelets 12 and 13 which are so located on the jaw members 2 and 1 respectively that lifting means attached to them tend to maintain the jaws of the "nut cracker" in the open position.

On the inside edge of each jaw member is located two or more studs 14 which act to aid the jaw members in gripping the stump. On the "low cut" stumps these studs 14 do not present sufficient gripping action to prevent the stump puller from slipping off of the stump. Therefore, there is attached to each jaw member a set of teeth 15 that are designed and located in such a position that when the nut cracker is clamped against a stump, the teeth 15 will be forced into the stump below the ground roots. These teeth 15 are pointed to facilitate clamping into the stump and are further curved inwardly towards the opposite jaw member to such a degree that the points of the teeth 15 extend well beyond the inside edge of the jaw member to which the said teeth are attached. The teeth 15 and studs 14 allow the "nut cracker" to be positively clamped against the stump so that there is no chance of the "nut cracker" slipping off the stump. Therefore the stump may be pulled from the ground by the stump puller without trouble.

It will be noted that Figure 1 shows these teeth 15 positioned on each jaw member, but that two of these teeth were omitted in both Figures 2 and 3 in order to allow a clearer drawing to be made. It will be understood that teeth are to be located in holes 16, 17, 18, and 19.

Figures 6, 7:
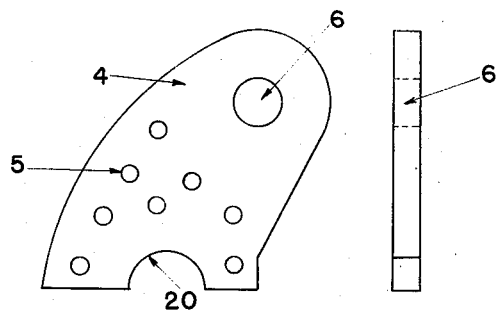
Figure 6 is a plan view of a hinge plate used in conjunction with a pin to fasten the right and left hand members of the unit together.
Figure 7 is a side view of the hinge plate of Figure 6.

In Figure 6 representing the hinge plate 4 the semicircle 20 is removed from the plate to provide clearance when it is necessary to use a wrench on the tooth that is placed in hole 17, Figure 3.

Figures 8, 9:
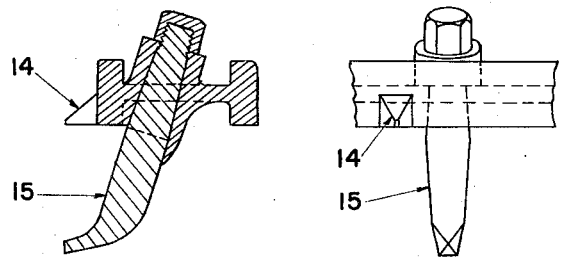
Figure 8 is a cross section view along the line 8—8 of Figure 1 and shows the construction of a unit tooth.
Figure 9 is a side view of the unit tooth construction shown in Figure 8.

By referring to Figures 8 and 9, the construction of the teeth 15 and the method of attachment of these teeth to the right and left hand members, 1 and 2, of the "nut cracker" will be apparent. The teeth are threaded for a nut which securely positions the individual teeth in place and this design also provides a convenient means of replacing damaged teeth. The teeth are curved inwardly and further set at a slight angle so that they will point towards the jaw member to which they are not attached. The design allows the teeth to reach under the surface or ground roots of a stump and thereby obtain a positive hold on the "low cut" stump which is impossible with all other types of stump pullers.

The assembled "nut cracker" is shown perspectively in Figure 11, and is attached to a crane boom 20 by means of a yoke 21 and to the drag line 22 of the crane through a pulley 23. From Figure 11 it will be apparent to those skilled in the art that to remove a stump the "nut cracker" with the jaws 1 and 2 in an open position is lowered over the stump to be removed by means of the crane boom cable 24, and then, after clamping the jaws around the stump by drawing the drag line 22 tight, horizontally pulling the stump from the ground by means of the crane drag line 22. The yoke 21 tends to keep the jaws 1 and 2 of the nut cracker in the open position while the "nut cracker" is placed over the stump by crane boom cable 24. When the "nut cracker" is lowered over a stump, it settles into close contact with the ground due to its weight, and this close contact with the ground allows the teeth of the device to enter into the stump below the surface roots of the stumps. This means of clamping the stump below the surface roots provides a stump puller which may be used successfully with "low cut" stumps.

It will be apparent that the shape of the jaws of the "nut cracker" may be altered in design and the type, location and number of the studs and teeth may also be altered, but it is to be understood that such alterations are contemplated and are to be included within the scope and spirit of this invention. Further although this "nut cracker" is designed to be used with "low cut" stumps, it is also very effective in any stump operations.

The drawings of Figures 1, 2, and 3 indicate that the individual jaw members are designed to give sufficient strength to insure efficient operation but that wherever possible, the members are designed to decrease the total weight of the device. Therefore, it will be understood that the actual shape of the individual jaw members may be varied to obtain optimum strength and weight.

The novel design and extreme usefulness of this "nut cracker" will be obvious to those skilled in the art. Such a "nut cracker" makes the removal of "low cut" stumps economically possible and presents the possibility of stumping operations over a large area that cannot be worked with the present type stump pullers.

It will be understood that the details and examples given hereinbefore are illustrative only, and in no way limiting on my invention as broadly described hereinbefore and in the appended claims.

What I claim and desire to protect by Letters Patent is:

1. In a stump puller of the type comprising a pair of hinged members, means for drawing the unhinged ends together and means attached to the top face of each member for lifting the stump puller and for maintaining the members in an open position, the improvement comprising a plurality of projecting fingers attached to the bottom face of each said member and extending downwardly and inwardly towards the opposite jaw member.

2. In a stump puller of the type comprising a pair of hinged members, means for drawing the unhinged ends together, and means attached to the top face of each member for lifting the stump puller and for maintaining the members in an open position, together with a plurality of studs attached to the inside face of each member, the improvement comprising a plurality of projecting teeth like members attached to the bottom face of each said hinged member and extending downwardly and inwardly towards the opposite jaw member.

3. A stump puller of the type described comprising a pair of members hinged together at one end, a plurality of studs projecting from the inner portions of said members, a plurality of fingers projecting downwardly and inwardly from the lower portions of said members, said members being normally in an open position, and means for urging the hinged members toward a closed position whereby the studs and inner portions of the members embrace the peripheral portion of a stump or other object to be removed and the downwardly and inwardly directed fingers enter the stump below the surface roots.

4. A stump pulling device comprising a pair of curved arms, means hinging the arms together at one end thereof, said arms being normally in an open position to facilitate placing the device in operative condition, elongated fingers projecting downwardly and inwardly from the lower portions of the arms and means for urging said arms together.

5. A stump pulling device comprising a pair of curved arms, means hinging the arm portions together at adjacent end portions thereof, a plurality of teeth projecting downwardly and inwardly from the lower portions of the arms, and means for bringing the curved armed portions inwardly toward one another whereby a stump may be securely gripped therein.

REX J. RAMER.